Oct. 30, 1934.    R. MARTIN    1,978,641
ILLUMINATING PROJECTILE
Filed April 18, 1923    5 Sheets-Sheet 1
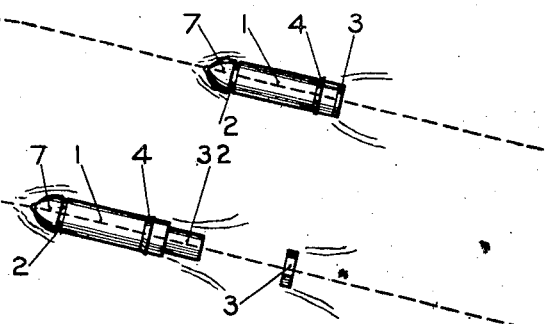
Fig. 1
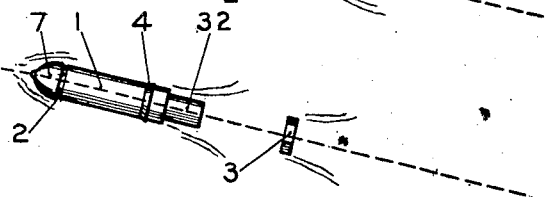
Fig. 2
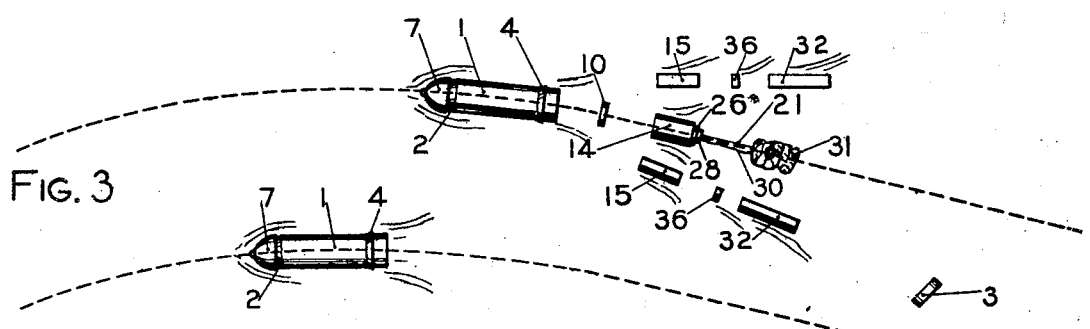
Fig. 3
Fig. 4
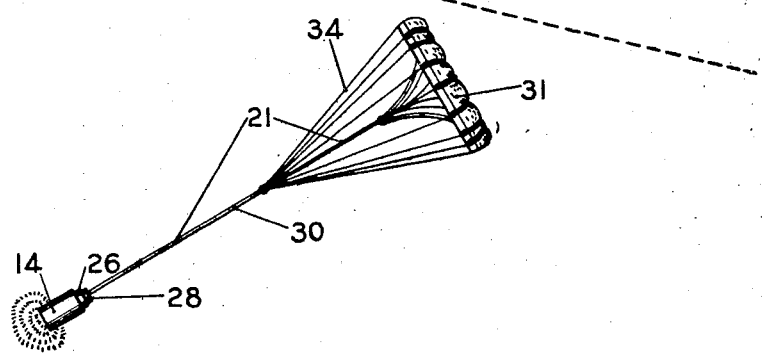
Fig. 5
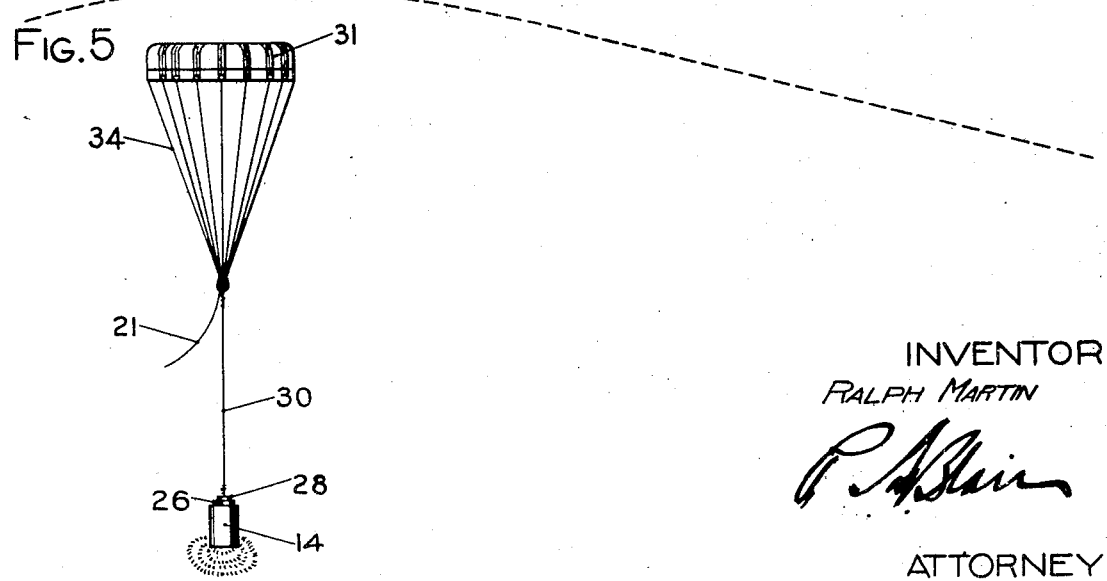
INVENTOR
RALPH MARTIN
ATTORNEY Oct. 30, 1934.  R. MARTIN  1,978,641
ILLUMINATING PROJECTILE
Filed April 18, 1923    5 Sheets-Sheet 2
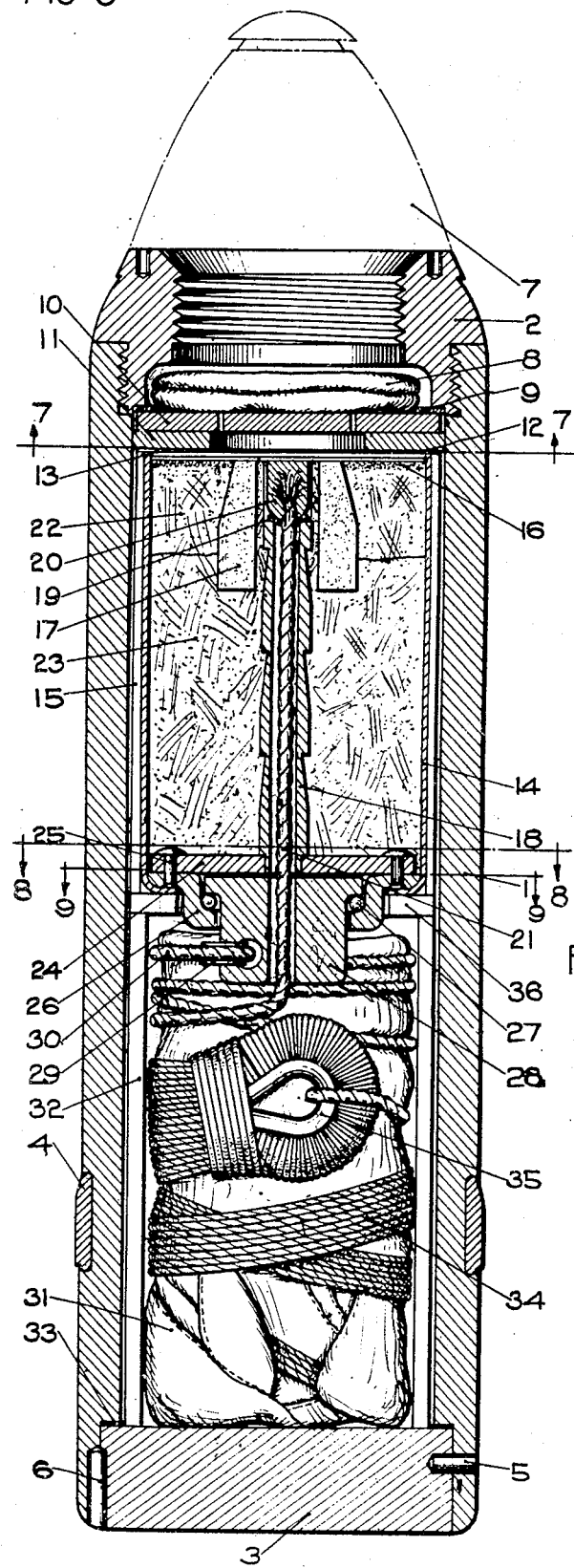
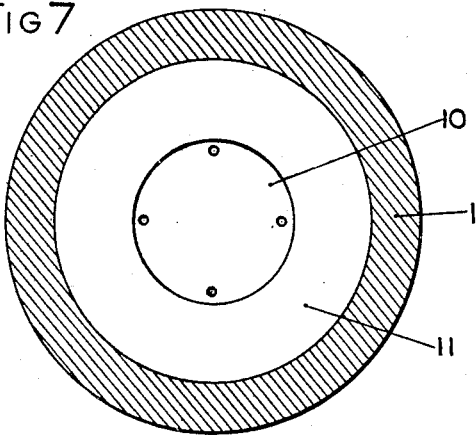
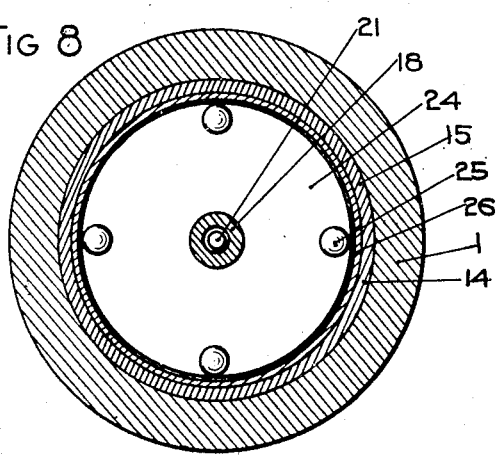
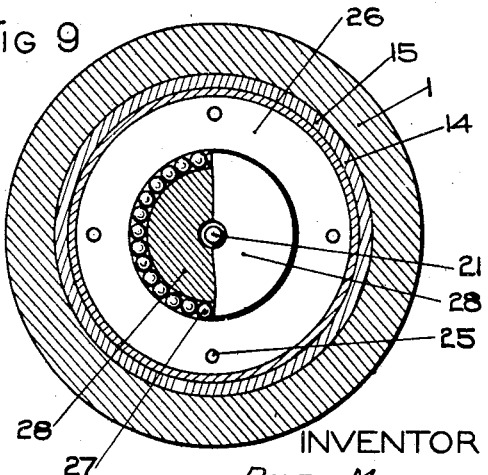
INVENTOR
RALPH MARTIN
ATTORNEY Oct. 30, 1934.     R. MARTIN     1,978,641
ILLUMINATING PROJECTILE
Filed April 18, 1923     5 Sheets-Sheet 3
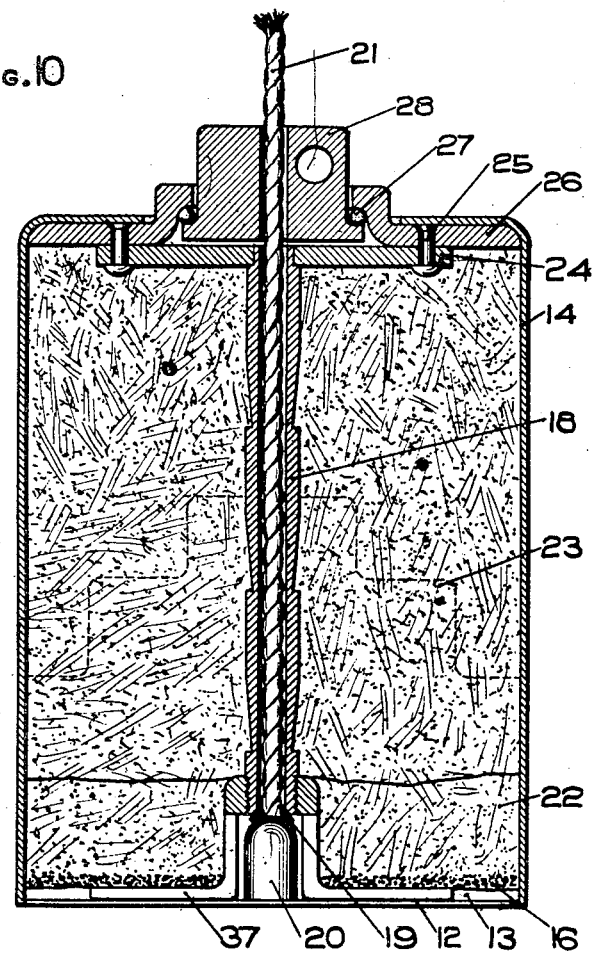
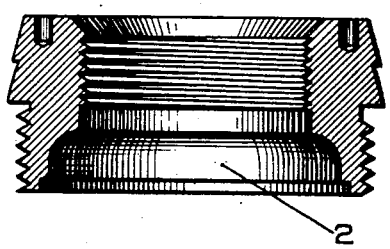
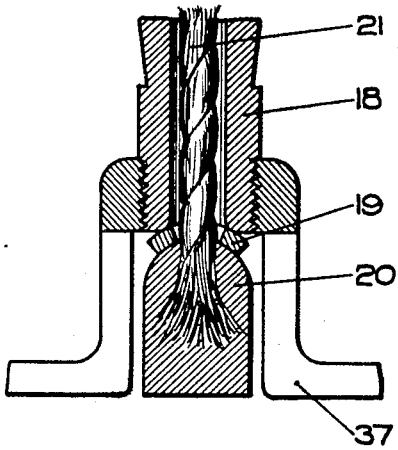
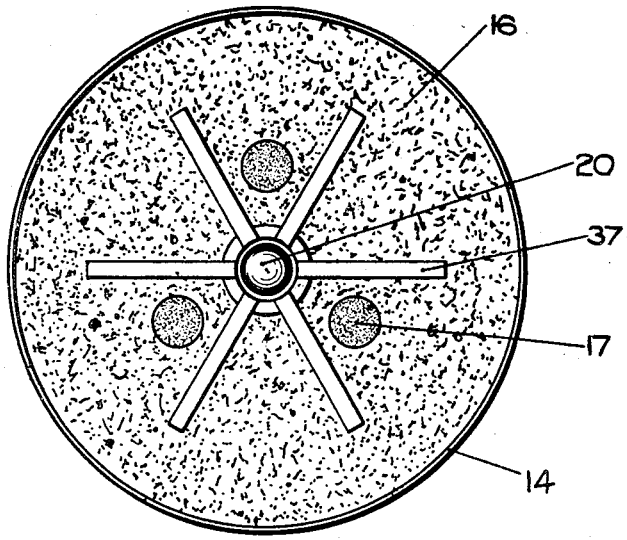
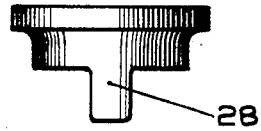
INVENTOR
RALPH MARTIN
ATTORNEY Oct. 30, 1934.  R. MARTIN  1,978,641
ILLUMINATING PROJECTILE
Filed April 18, 1923   5 Sheets-Sheet 4

INVENTOR
RALPH MARTIN
ATTORNEY

Oct. 30, 1934.  R. MARTIN  1,978,641
ILLUMINATING PROJECTILE
Filed April 18, 1923  5 Sheets-Sheet 5
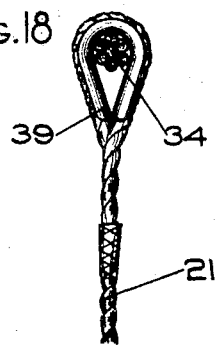
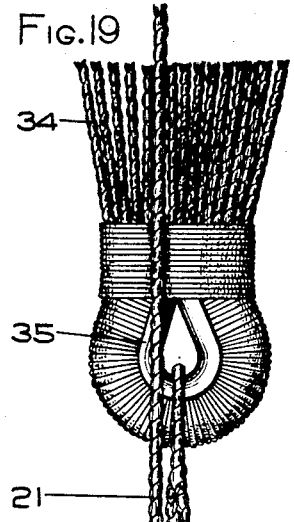
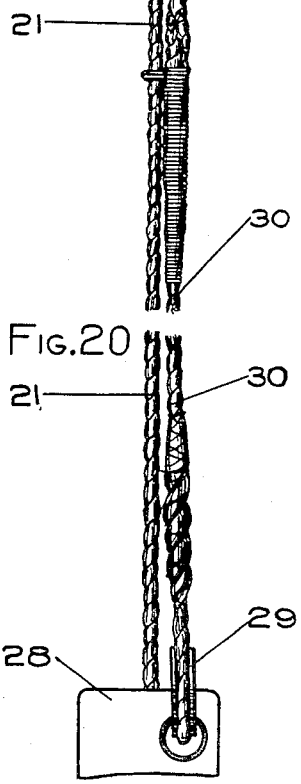
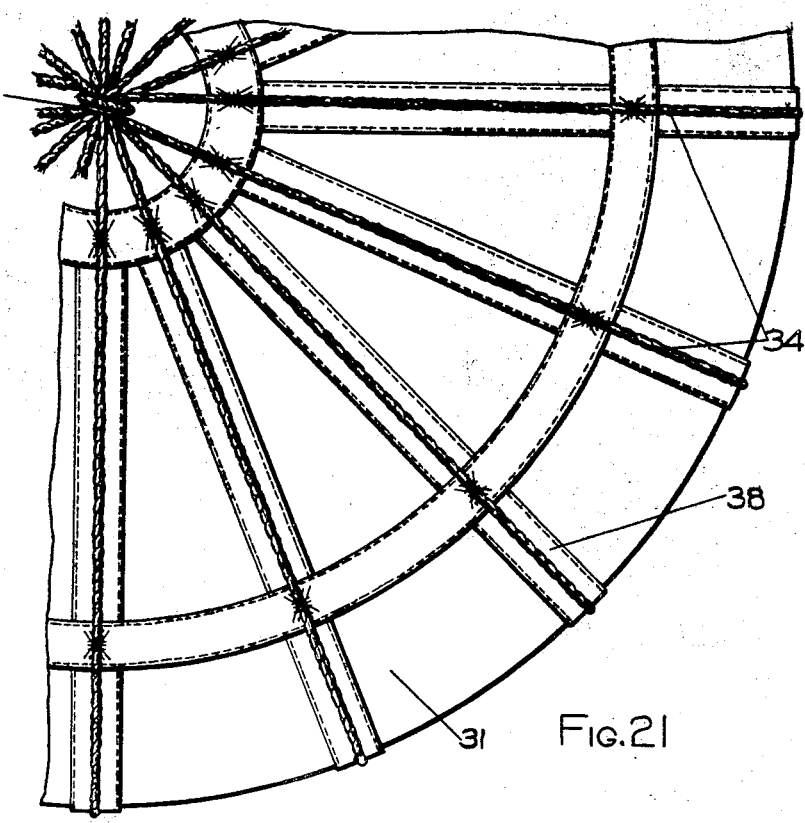
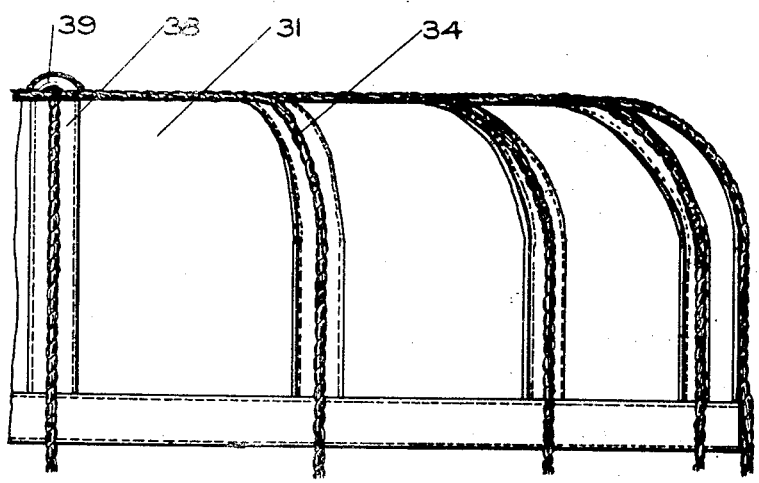
INVENTOR
RALPH MARTIN
ATTORNEY Patented Oct. 30, 1934

1,978,641

UNITED STATES PATENT OFFICE 1,978,641

ILLUMINATING PROJECTILE

Ralph Martin, Baldwin, N. Y., assignor to the Government of the United States

Application April 18, 1923, Serial No. 633,025

5 Claims. (Cl. 102—29)

This invention relates to improvements in illuminating projectiles and one of its objects is to provide an improved projectile of the above character which will be more reliable and efficient in use and operation.

A further object is to provide a simple and practical illuminating projectile which may be inexpensively manufactured and assembled.

A further object is to provide a practical illuminating projectile involving the use of a single parachute which will act not only to retard the illuminant or charge when ejected from the rear of the projectile but also sustain the same after it has been released and retarded.

By way of further explanation of the objects sought to be accomplished by the present invention, it may be stated that the standard type of illuminating projectile contains three or more parachutes attached to a common cable. This type must be rolled carefully so that, when it comes into action, it will remain intact and be free to carry out its functions of retarding, and suspending the illuminant. Frequently, this type fails, partially or wholly, due to fouling or by the cords becoming entangled, etc.; furthermore, a certain percentage fail to operate on account of being improperly rolled, and for numerous other reasons. In order to increase the efficiency of the illuminating projectiles, it was found necessary to overcome some or all of the above faults. Therefore, the single type parachute was designed which is believed, judging from results obtained from ballistic tests, is equally as efficient, if not superior, to the standard type. Furthermore, it can be manufactured at less cost because it contains less wire cable, cords and silk, and the labor involved to construct is reduced proportionately.

In addition to the above, in order to reduce the cost of the projectile, the base of the illuminant container has been redesigned. The copper coils in the five-inch illuminating projectiles have been replaced by a center tube, which acts as an anchor to the illuminant composition. This change increases the capacity of the container and consequently the result is a longer burning period.

For use in larger calibres, a grid in the form of a spider has been designed to be secured on the center tube to keep small particles of illuminant, which may become loosened, from falling out; thereby lengthening the time of burning.

Other objects will be in part obvious and in part hereinafter pointed out in connection with the accompanying sheets of drawings illustrating a further embodiment of the present invention and wherein corresponding reference characters denote similar parts.

In these drawings, Figures 1 to 5 inclusive are diagrammatic views illustrating the various steps in the operation of the invention.

Figure 6 is a longitudinal section of the projectile showing the arrangement of all the internal parts.

Figure 7 is a sectional view on line 7—7 of Figure 6 looking forward.

Figure 8 is a sectional view on line 8—8 of Figure 6 looking backward.

Figure 9 is a sectional view on line 9—9 of Figure 6 looking backward.

Figure 10 is an enlarged view of the illuminant assembly.

Figure 11 shows end view of illuminant assembly with grid in position.

Figure 12 is a view of the new type of recessed adapter.

Figure 13 shows detailed view of swivel contact joint.

Figure 14 is a view of the new type swivel pin.

Figure 18 shows method of attaching the center wire to the parachute.

Figure 19 shows how rigging cords are secured and attached to connecting wire.

Figure 20 illustrates how the connecting wire is attached to the illuminant.

Figure 21 shows a sectional view of the parachute and the method of rigging.

Figure 22 shows the sidewall of the parachute and method of rigging same.

Figure 15:
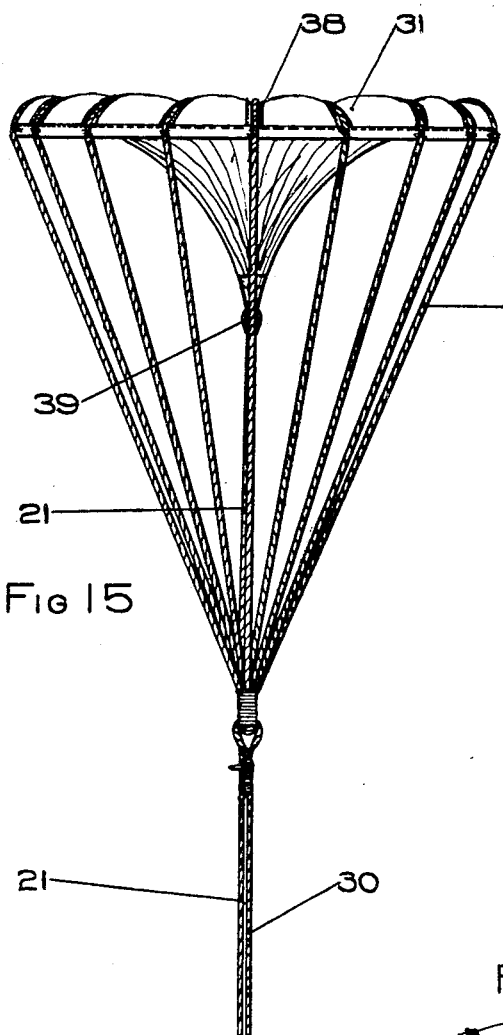
Figure 15 shows the parachute in retarding position immediately after ejection from projectile.

Referring now to the drawings in detail, the projectile 1 is provided with an adapter 2 shown in Figure 12 recessed so as to enlarge the cubical capacity of the projectile. The rear of the projectile is closed by a base 3 and has the usual rotating band 4. Sheer pins 5 and 6 hold the base in place until the assembly is discharged on operation of a time fuse 7. The recess in the adapter 2 is sufficiently large to accommodate an expelling charge 8 held by a ring 9 as shown in Figure 6, which is a vertical section of the complete projectile. A gasket 11 is preferably located between the baffle plate 10 and cover discs 12 and 13 which is considered an improvement over the spacing washer heretofore used in projectiles of this character. The cover plates hold a sprinkling of powder 16 and igniter 17 in place. The gasket is preferably made of felt or other suitable material of like physical properties. This gasket and the gasket 33 permit all the interior parts of the projectile to be assembled so that there is a certain amount of compression thereby to snugly hold the parts in position and prevent any relative longitudinal movement which might otherwise injure, disturb or agitate the composition forming the illuminant at the moment the interior parts are expelled from the projectile body. Furthermore, it confines the flash or gases of the expelling charge to that portion of the projectile body above the baffle plate and prevents the setting on fire or scorching of the parachute and its component parts.

A swivel contact joint shown in detail in Figure 13 is provided and is made up of several units including a center tube 18, a center wire 21, a cupped washer 19 and a knob 20. The tube 18 is provided with a central bore and is located in the center of a container tube 14 which latter is riveted to a container plate 24. Through this bore passes a wire 21 adapted to be connected with a parachute 31 at one end after passing through a hole in a swivel pin 28 mounted in a cup 26 riveted at 25 to plate 24. Bearings 27 permit an easy turning movement between the parachute and the flare. The other end of the wire 21 passes through the cupped washer 19 and terminates in the knob 20 to provide a swivel connection. This knob is preferably made of a fusible material of fairly low melting point, preferably an alloy consisting of two parts of tin and one part of lead. The end of the knob which rests in the cupped washer 19 is rounded off to fit the curvature of the washer and the washer rests on the inside edge of the center tube 18 which is similarly rounded so that the washer makes a contact all around and is free to swivel. This tube 18 serves to anchor the illuminant in the container tube by means of grooves cut in the tube as shown more clearly in Figure 10.

Figure 16:
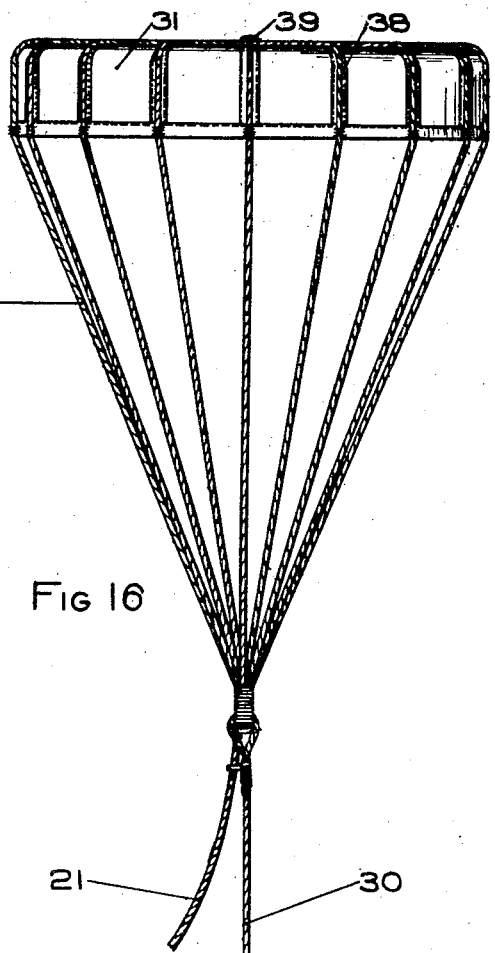
Figure 16 shows the parachute in suspension position with the center wire released after a period of retardation.

In the larger calibre of shells or projectiles a grid 37 in the form of a spider is preferably secured to the end of the center tube thereby to keep small particles of mixture which may become loosened from falling out thus lengthening the time of burning of the illuminant. The swivel pin 28 is provided with a center hole for the supporting wire 21 and also a transverse hole offset with respect to the longitudinal axis for a single wire 30 attached off center at 29 as shown in Figure 16. A single parachute 31 is used in this type of projectile and functions in the following manner. The parachute after ejection opens and the center wire 21 is of such length as to allow the parachute to partially open so that its center is drawn in by the center wire as shown in Figure 15 thereby offering a relatively small area which retards the momentum of the illuminant. After a period of retardation, the length of which can be varied and depends on whether the projectile is high or low velocity, the heat of the burning illuminant causes the knob 20 to fuse and the center wire is released and the parachute opens up and suspends the illuminant as shown in Figure 16. In a high velocity projectile the period of retardation should, of course, be greater than that for a projectile of lower velocity.

Figure 17:
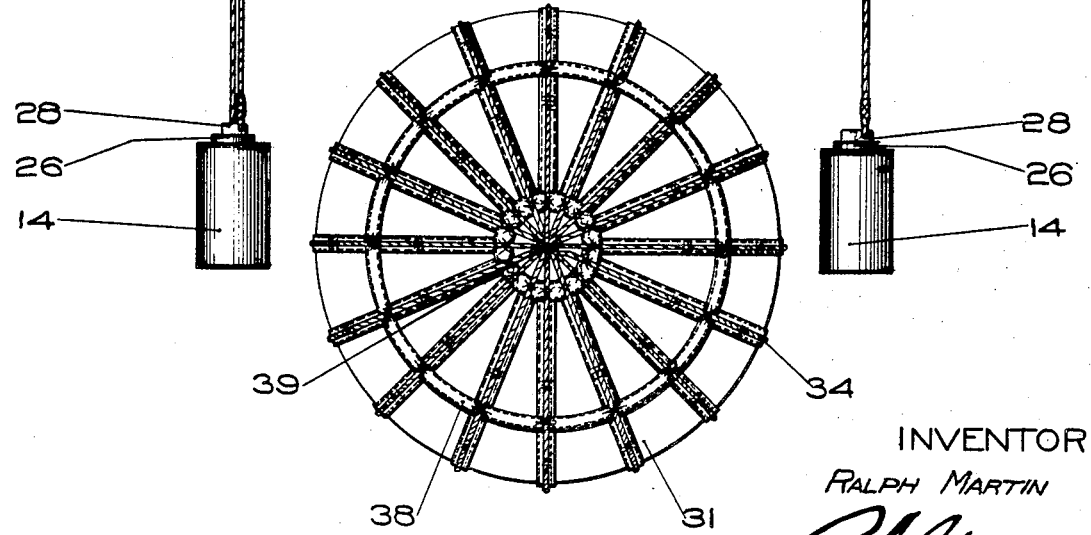
Figure 17 shows top view of parachute in suspending position.

The parachute is preferably made up of a plurality of segments so shaped as to provide a flat top and side wall which gives it the property of holding the air and a hole in the center of the parachute as shown in Figure 17 gives vent to the air and absorbs the shock upon release of the center wire and furthermore steadies the parachute during its descent. The length of the center wire depends upon the size of the projectile and the velocity of the projectile.

In Figures 1 to 5 wherein is illustrated semi-diagrammatically the operation of the device, it will be noted that after a predetermined time or interval the time fuse 7 ignites the expelling charge 8 forcing the entire assembly rearwardly from the projectile, the end wall 3 held in place by shear pins 5 and twist pins 6 being forced out first as shown in Figure 2. The illuminating body 22—23 is enclosed in two semi-cylindrical shields 15, the forward ends of which abut the washer 11 and the rear ends abut the washer 36 likewise the parachute is enclosed in two semi-cylindrical shields 32. The entire assembly is forced rearwardly from the projectile 1 as shown in Figure 3 and the parts or shields 15 and 32 together with the gaskets 10 and 36 fall away from the star. In the meantime, however, the star has been ignited and the parachute assumes the position shown in Figure 4, being only partially opened. The heat of the burning star, however, shortly melts the knob 20 in Figure 13 releasing the wire 21 which permits the parachute to come to full open position and slowly descend supporting the star from the ends of the cords 34 attached to the eye 35.

From the above it will be seen that the present invention provides a simple, practical and more reliable and efficient illuminating shell than heretofore used. The relatively few parts may be inexpensively manufactured and assembled.

Without further analysis, the foregoing will so fully reveal the gist of this invention that others can by applying current knowledge readily adapt it for various applications without omitting certain features that, from the standpoint of the prior art, fairly constitute essential characteristics of the generic or specific aspects of this invention, and, therefore, such adaptations should and are intended to be comprehended within the meaning and range of equivalency of the following claims.

What I claim is:—

1. In an illuminating projectile, in combination, an assembly adapted to be ejected rearwardly from the projectile comprising a chamber containing an illuminant, a fusible member therein, a parachute, a hollow swivel attached to a wall of the chamber, means passing through the swivel and connecting the parachute with the fusible member, said means restraining complete opening of the parachute until a predetermined heat of the illuminant is attained, and means connecting the parachute and swivel for supporting the chamber after the first said means has become disconnected.

2. In an illuminating projectile, in combination, an assembly adapted to be ejected rearwardly from the projectile comprising a container, an illuminant therein, a swivel mounted in the wall of the container, a parachute, means connecting the parachute with the swivel, a rotatable fusible member, within the container and means connecting the parachute and fusible member whereby full opening of the parachute is prevented until after the assembly has been ejected and retarded.

3. In a projectile of the character described, in combination, an assembly adapted to be ejected from said projectile comprising an open ended receptacle adapted to contain illuminant, a central member having a roughened surface for holding the illuminant in place, said central member being tubular and having a central attaching cable passing therethrough, said attaching means being connected at one end to a parachute and its opposite end being provided with a fusible plug adapted to melt after illuminant has become ignited.

4. In an illuminating projectile, in combination, an assembly adapted to be ejected rearwardly from the projectile comprising a chamber containing an illuminant, a hollow swivel attached to a wall of the chamber, a parachute, means passing through the swivel and connecting the parachute with the illuminant chamber, and means connecting the parachute with the swivel.

5. In an illuminating projectile, in combination, an assembly adapted to be ejected rearwardly from the projectile comprising an illuminant chamber, a swivel attached to a wall of the chamber having a central bore and an off-center connection, a parachute, means passing through the bore of the swivel for connecting the parachute with the chamber, and means connecting the parachute and off-center connection.

RALPH MARTIN.